June 18, 1963  F. KLÖHN  3,094,157
VEHICLE TIRE
Filed July 28, 1961
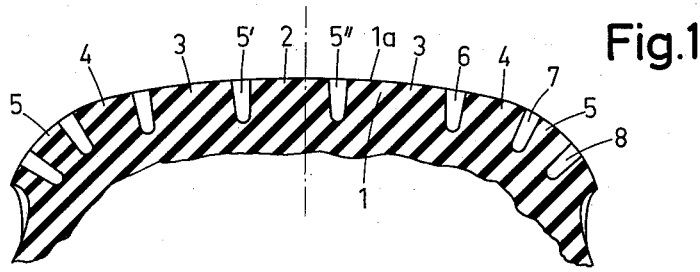
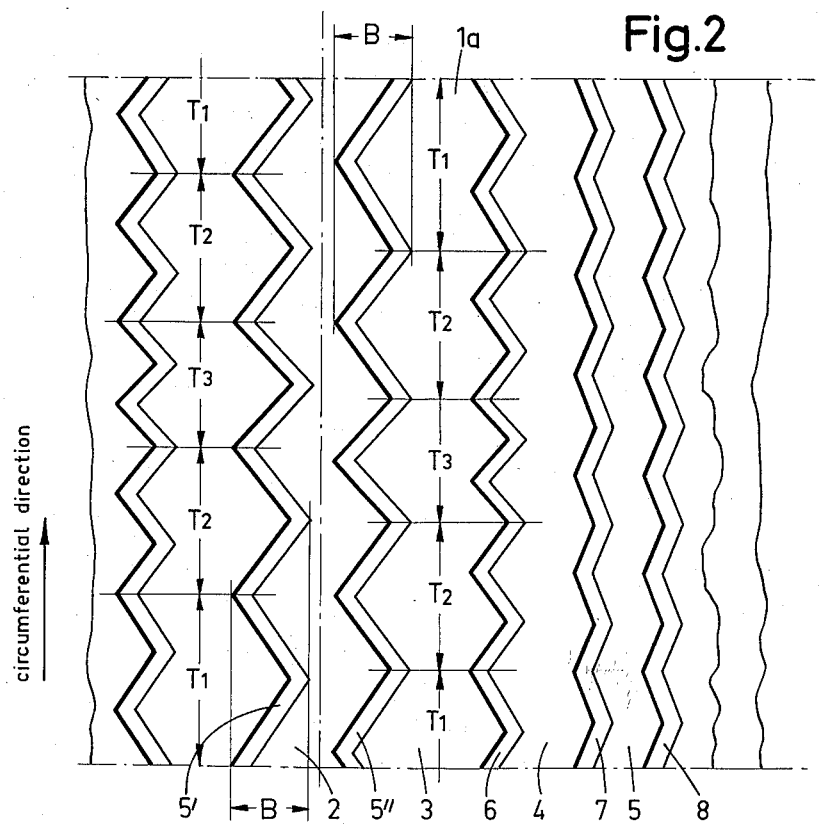
INVENTOR
Friedel Klöhn
BY

United States Patent Office 3,094,157
Patented June 18, 1963

3,094,157
VEHICLE TIRE
Friedel Klöhn, Hannover, Germany, assignor to Continental Gummi-Werke Aktiengesellschaft, Hannover, Germany
Filed July 28, 1961, Ser. No. 127,579
Claims priority, application Germany Aug. 1, 1960
5 Claims. (Cl. 152—209)

The present invention relates to a vehicle tire and, more specifically, concerns the tread surface formation of a vehicle tire, especially with rounded tread surface marginal portions, while the tread strip is provided with substantially zigzag shaped ribs extending in circumferential direction of the tire, said ribs preferably being confined by substantially zigzag shaped circumferential grooves.

It is an object of the present invention to provide a tire of the above-mentioned type which, in addition to the advantages of heretofore known tires with zigzag circumferential ribs, will be characterized in that at practically all speeds, the tire will be free from any material tire noises.

It is also an object of this invention to provide a tire as set forth in the preceding paragraph, which will have increased slip resistance.

It is another object of this invention to provide a tire with zigzag shaped circumferential tread ribs, which will be characterized by a practically uniform wear of the tread strip.

These and other objects and advantages of the invention will appear more clearly from the following specification in connection with the accompanying drawing, in which:

FIGURE 1 is a transverse partial section of the tread strip of a vehicle tire.

FIGURE 2 is a top view of the tread surface of a tire according to FIGURE 1.

The tire according to the present invention is characterized primarily in that with the circumferential ribs, when viewed in transverse direction of the tire, uneven pitch sections of the circumferential grooves or edges confining the ribs are located opposite to each other. Preferably, the arrangement is such that at least the pitch sections on one side of the circumferential rib, when viewed in the circumferential direction of the tire, are different from each other. It has furthermore proved advantageous so to select the circumferential ribs or pitch sections that with a plurality of circumferential ribs arranged alongside each other, the pitch decreases toward the marginal area of the tread surface.

A tire of the above-mentioned character develops practically no tire noise at any speeds and is slip-resistant and yields greater brake safety than heretofore known tires with zigzag shaped circumferential ribs, while the wear of the tread is practically uniform.

The slip and brake safety is particularly increased when the tire, due to centrifugal forces, for instance when driving through a curve, is deformed and the load is displaced toward the outer circumferential ribs with the shorter pitch sections. This effect is of particular importance with tread surfaces having rounded marginal areas because these areas will, due to the influence of the lateral forces, in conformity with the desired curvature, engage the road more or less.

Referring now to the drawing in detail, the tread strip 1 of the tire has a substantially centrally located zigzag shaped circumferential rib 2 confined at both sides thereof by circumferential grooves 5′ and 5″. As will be seen from the drawing, the tread surface 1a is provided with further zigzag shaped circumferential ribs 3, 4 and 5 located at both sides of rib 2.

In particular, the centrally located circumferential rib 2 is, as to its general contour, designed in customary manner. However, in contrast to heretofore known tires with zigzag shaped circumferential ribs, rib 2 is confined by groove sections or pitch sections $T_1$, $T_2$ and $T_3$, which, when viewing in transverse direction and in circumferential direction of the tire, differ from each other. Assuming the same width B of the circumferential grooves 5′, 5″ confining the circumferential rib 2, these grooves have pitch sections $T_1$, $T_2$ and $T_3$. The sequence of these pitch sections is so selected that the pitch section $T_3$ is not followed by the pitch section $T_1$, but by pitch section $T_2$ which differs from pitch section $T_3$ by a fraction of a pitch section. The sequence of the pitch sections of groove 5′ corresponds to that of groove 5″. However, it should be noted that the two grooves 5′ and 5″ are offset with regard to each other in circumferential direction of the tire by half a pitch section. Thus, for instance, the pitch section $T_3$ of the circumferential groove 5″ is located opposite a groove section of groove 5′, which groove section is composed of sections of the pitch sections $T_2$ and $T_3$.

The circumferential grooves 6 arranged on the respective tread portions are selected in conformity with the pitch sections of grooves 5′ and 5″. However, it should be noted that the pitch is less than the pitch of the circumferential grooves 5′ and 5″. The irregularly shaped circumferential groove 6 which, together with circumferential groove 5″ confines the circumferential rib 3, has associated therewith the regularly shaped circumferential groove 7 so that the circumferential rib 4, on one side, is confined by an irregularly shaped circumferential groove 6 and on the other side, by a regularly shaped circumferential groove 7. In the rounded portion of the tread strip there is provided a further circumferential groove 8 for confining the zigzag shaped circumferential rib 5. This circumferential groove may, however, also be shaped in conformity with the circumferential grooves 5′, 5″ and 6.

It may furthermore be mentioned that the profiles of the two halves of the circumferential surface, with the exception of the above-mentioned displacement in the pitch by approximately half a pitch, correspond to each other. It is also advantageous so to design the circumferential grooves that their width decreases toward the marginal portion of the tread strip, as shown in the drawings.

It is, of course to be understood, that the present invention, is by no means, limited to the particular construction shown in the drawing but also comprises any modifications within the scope of the appended claims.

What I claim is:

1. A vehicle tire which comprises a tread strip having a plurality of sharp-edged zigzag-shaped grooves extending in circumferential direction of said tread strip and being arranged in spaced relationship to each other so as to confine therewith sharp-edged zigzag-shaped circumferential ribs, at least some of said ribs respectively varying in width measured in a direction perpendicular to the direction of travel of said tire, and at least some adjacent ones of said grooves being sub-divided into successive series of different pitch sections following each other in at least one series in a definite order and in successive series changing this order along one and the same groove by skipping one pitch section only at a time, the different pitch sections of each series being substantially identical to each other, the zigzag-shaped grooves on one side of that plane of symmetry of the tire which is transverse to the axis of rotation thereof being identical to but the image of the zigzag-shaped grooves on the other side of said plane of symmetry, and on each side of said plane of symmetry each varying pitch section of one groove being offset with regard to the respective adjacent varying pitch section of the respective adjacent groove in longitudinal direction thereof by approximately one-half of the respective pitch section.

2. A vehicle tire according to claim 1, in which the number of zigzag-shaped groove sections within each pitch section increases with the distance of the respective groove from said plane of symmetry.

3. A vehicle tire which comprises a tread strip having a plurality of sharp-edged zigzag-shaped grooves extending in circumferential direction of said tread strip and being spaced in transverse direction from each other so as to confine therebetween sharp-edged zigzag-shaped circumferential ribs respectively varying in width measured in a direction perpendicular to the direction of travel of said tire, the central one of said ribs being confined by identical grooves respectively having the same number of successive series of different pitch sections following each other in at least one series in a definite order and in successive series changing this order along one and the same groove by skipping one pitch section only at a time, the different pitch sections of each series being substantially identical to each other, on one and the same side of that plane of symmetry of the tire which is perpendicular to the axis of rotation of the tire the total of all different pitch sections directly following each other in one and the same groove being offset in circumferential direction of the tire with regard to all different pitch sections directly following each other in the respective adjacent groove on the same side of said plane of symmetry so that one pitch section of one groove on one side of said plane of symmetry is faced by more than one pitch section of an adjacent groove on the same side of said plane of symmetry.

4. A vehicle tire according to claim 1, in which the outer edge portions of said tread strip are rounded and provided with sharp-edged zigzag-shaped grooves.

5. An arrangement according to claim 1, in which the grooves on one side of said plane of symmetry are offset with regard to the grooves on the other side of said plane of symmetry by approximately one-half of one of said groove sections.

References Cited in the file of this patent

UNITED STATES PATENTS

| | | |
|---|---|---|
| 2,006,197 | Ewart et al. | June 25, 1935 |
| 2,124,821 | Hubach | July 26, 1938 |
| 2,255,994 | Bush | Sept. 16, 1941 |
| 2,808,867 | Buddenhagen et al. | Oct. 8, 1957 |
| 2,878,852 | Lippmann et al. | Mar. 24, 1959 |
| 2,962,072 | Skidmore | Nov. 29, 1960 |
| 3,023,798 | Moore et al. | Mar. 6, 1962 |

FOREIGN PATENTS

| | | |
|---|---|---|
| 555,633 | Great Britain | Sept. 1, 1943 |